(12) United States Patent
Choi

(10) Patent No.: US 9,984,560 B2
(45) Date of Patent: May 29, 2018

(54) SYSTEM AND METHOD FOR GUIDING RESULT OF REMOTE CONTROL USING MOBILE DEVICE

(71) Applicant: Kia Motors Corporation, Seoul (KR)

(72) Inventor: Min-Seok Choi, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/346,011

(22) Filed: Nov. 8, 2016

(65) Prior Publication Data

US 2017/0372599 A1    Dec. 28, 2017

(30) Foreign Application Priority Data

Jun. 27, 2016  (KR) .................... 10-2016-0079854

(51) Int. Cl.
| | | |
|---|---|---|
| *G08C 17/02* | (2006.01) | |
| *H04W 4/22* | (2009.01) | |
| *H04W 24/00* | (2009.01) | |
| *H04Q 7/38* | (2006.01) | |
| *H04W 4/04* | (2009.01) | |
| *H04W 4/14* | (2009.01) | |

(52) U.S. Cl.
CPC ............ *G08C 17/02* (2013.01); *H04W 4/046* (2013.01); *H04W 4/14* (2013.01); *G08C 2201/93* (2013.01)

(58) Field of Classification Search
CPC ... G08C 17/02; B60R 25/1004; B60R 25/245; H04W 76/002; H04W 24/00; H04W 4/22; H04L 47/10; H04Q 7/38
See application file for complete search history.

(56) References Cited

U.S. PATENT DOCUMENTS

| | | | | |
|---|---|---|---|---|
| 2002/0002062 A1* | 1/2002 | Itazu | ...................... | H04W 24/00 455/557 |
| 2004/0077362 A1* | 4/2004 | Chinomi | ............. | H04W 76/002 455/456.5 |
| 2004/0248561 A1* | 12/2004 | Nykanen | ................. | H04L 47/10 455/414.2 |
| 2007/0024416 A1* | 2/2007 | Tang | ..................... | B60R 25/245 340/5.61 |
| 2007/0182538 A1* | 8/2007 | Ota | ..................... | B60R 25/1004 340/506 |
| 2011/0244846 A1 | 10/2011 | Min | | |
| 2015/0281932 A1* | 10/2015 | Park | ....................... | H04W 4/22 455/404.1 |

FOREIGN PATENT DOCUMENTS

| | | | | |
|---|---|---|---|---|
| JP | 2006332942 A | * 12/2006 | ............... | H04Q 7/38 |
| JP | 2014069592 | 4/2014 | | |
| KR | 10-2006-0036882 | 5/2006 | | |
| KR | 101082679 | 11/2011 | | |
| KR | 20130066183 | 6/2013 | | |

* cited by examiner

*Primary Examiner* — Yuri Kan

(74) *Attorney, Agent, or Firm* — Brinks Gilson & Lione

(57) ABSTRACT

Provided are a system and a method for guiding a result of remote control using a mobile device, and particularly, a system and a method for guiding a result of remote control, which determines a scheme that feeds back the remote control result of a vehicle to a mobile device app of a user.

7 Claims, 7 Drawing Sheets

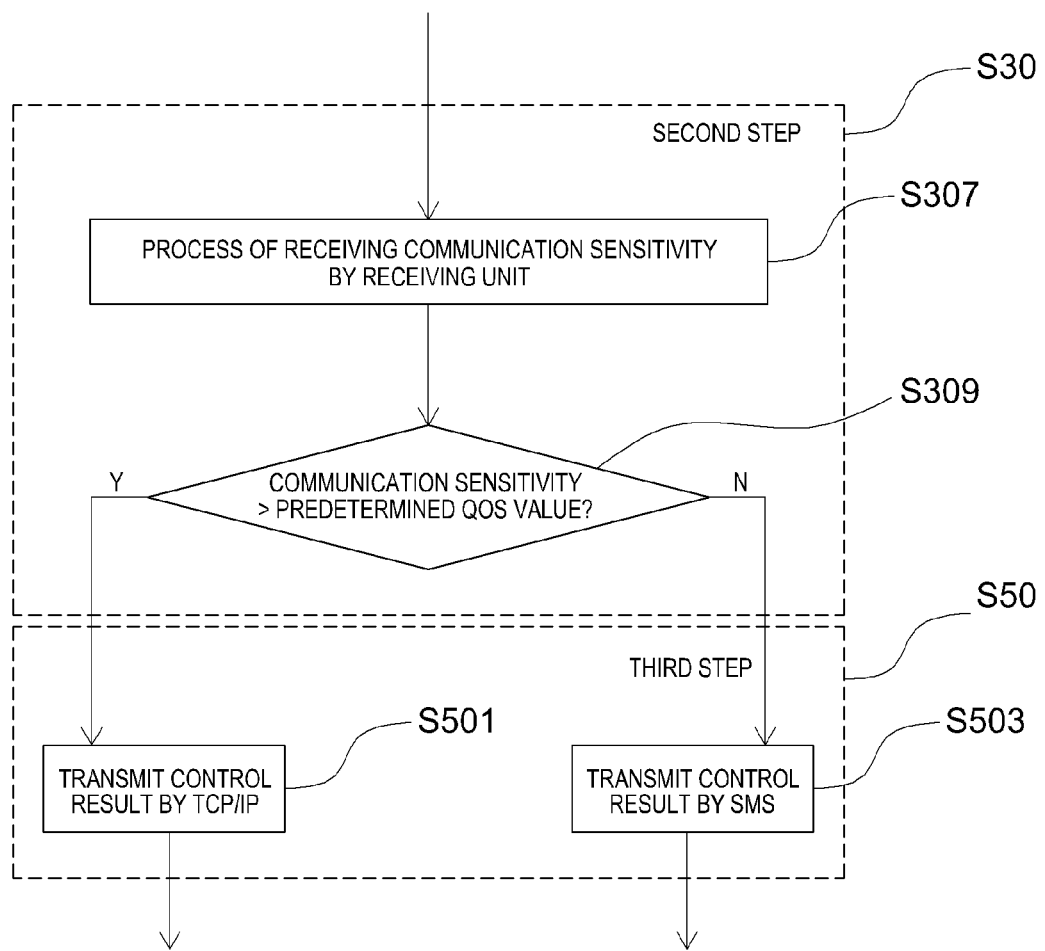

SYSTEM AND METHOD FOR GUIDING RESULT OF REMOTE CONTROL USING MOBILE DEVICE

CROSS-REFERENCE TO RELATED APPLICATIONS

This application claims priority under 35 U.S.C. § 119 to Korean Patent Application No. 10-2016-0079854, filed on Jun. 27, 2016, in the Korean Intellectual Property Office, the entirety of which is hereby incorporated by reference herein.

BACKGROUND

1. Technological Field

The present disclosure relates to a system and a method for guiding a result of remote control using a mobile device, and particularly, to a system and a method for guiding a result of remote control, which determines a scheme that feeds back a remote control result of a vehicle to a mobile device app being operated by a user on the mobile device.

2. Description of the Related Art

As the use of a smart phone which is one of mobile devices is popularized, various types of applications (hereinafter, referred to as an app) have been developed and used. Innovative and novel apps have been developed and supplied in various industrial fields in order to satisfy various wants and promote convenience of smart phone users, such as payment apps for financial transactions, apps for providing map information, apps for message management, and corporal form control apps as well as apps for general games.

As the grafting of the vehicles and IT technology have been issued, apps for remotely controlling vehicles are being introduced. When the apps for remotely controlling the vehicles are additionally described, first, a vehicle owner for remotely controlling the vehicle by using the mobile device such as the smart phone downloads and installs the app for remotely controlling the vehicle in the mobile device. When the installed app is executed, an image of a smart key is displayed on a display unit as an example and when an operation button such as door locking and door opening is touched in the displayed smart key, a corresponding control command is transferred to a server through a mobile communication network and the control command transmitted from the server again is transferred to a vehicular receiver installed in the vehicle through the mobile communication network, and as a result, a desired vehicle control operation, that is, door locking or door opening is performed.

In this regard, Korean Patent Publication (Registration) No. 2013-0066183 (VEHICLE REMOTE CONTROL SYSTEM AND METHOD THEREOF USING THE SMART PHONE) in the related art discloses a vehicle remote control system and an operating method thereof which can directly control a vehicle by using a remote control application installed in a smart phone. The related art includes a smart phone in which an application for remotely controlling an electronic control module mounted on the vehicle is installed and a telematics unit forming a wireless network directly with the smart phone to control the corresponding electronic control module according to a control request transmitted from the smart phone. Herein, the telematics unit authenticates the smart phone positioned in a communication area of the wireless network and activates the application installed in the authenticated smart phone.

The smart phone in the related art converts the control request input by a user into a format of a short message service (SMS) separately defined between a vehicle management center and the telematics unit and transmits the control request to the vehicle management center.

However, a providing scheme in the related art guides the remote control result through the SMS and in SMS transmission, cost is generated per SMS and customer inconvenience occurs due to a reception failure.

SUMMARY

The present disclosure provides a guide system and method which saves on costs for generating a SMS to return a remote control result in the related art.

The present disclosure also provides a guide system and method which saves a user from inconvenience due to a reception failure in the case of providing a remote control result through a system.

An exemplary form of the present disclosure provides a system for guiding a result of remote control using a mobile device in a system for remotely controlling a vehicle by using an app of a mobile device, including: a remote control processing unit configured to receive a control signal from the app and configured to transmit a control command depending on the control signal to the vehicle; a communication sensitivity analyzing unit configured to collect and analyze a phone position or communication sensitivity from the mobile device and to compare the communication sensitivity with a predetermined criterion value and determining a feedback scheme for a remote control result of the vehicle as either one of TCP/IP or SMS; and a remote control result transmitting unit configured to receive the control result of the vehicle from the remote control processing unit and to transmit the control result to the app according to the feedback scheme determined by the communication sensitivity analyzing unit.

The communication sensitivity analyzing unit may include a receiving unit configured to receive the phone position or communication sensitivity, a data unit configured to receive the phone position from the receiving unit and to search a remote control history or a customer's voice on command (VOC) statistics history during a predetermine period in the corresponding region where the mobile device is positioned and to verify whether the remote control history or customer VOC statistics history is more than a predetermined value, and an analysis unit configured to receive the communication sensitivity from the receiving unit to analyze whether the communication sensitivity is more than a predetermined value based on quality of service (QoS) and to determine the feedback scheme for the remote control result of the vehicle as either one of TCP/IP or SMS.

The remote control result transmitting unit may be configured to feed back the control result to the app through the SMS from the communication sensitivity analyzing unit when the communication sensitivity is equal to or less than the predetermined QoS criterion and to feed back the control result through the TCIP/IP when the communication sensitivity is more than the predetermined QoS criterion.

The remote control result transmitting unit may be configured to feed back the control result to the app through the SMS when the remote control history or customer VOC statistics history is equal to or less than the predetermined value from the communication sensitivity analyzing unit and to feed back the control result through the TCIP/IP when the remote control history or customer VOC statistics history is more than the predetermined value.

Another exemplary form of the present disclosure provides a method for remotely controlling a vehicle by using a mobile device, including: a first step of receiving, by a remote control processing unit of the mobile device, a control signal from the app and transmitting a control command depending on the control signal to the vehicle; a second step of determining, by a communication sensitivity analyzing unit that collects the phone position or the communication sensitivity from the mobile device, a feedback scheme for a remote control result of the vehicle as TCP/IP or SMS; and a third step of transmitting, by a remote control result transmitting unit receiving the control result of the vehicle from the remote control processing unit, the control result to the app according to the feedback scheme determined by the communication sensitivity analyzing unit.

The second step may include a process of receiving, by a receiving unit of the communication sensitivity analyzing unit, a phone position from the mobile device, a process of searching, by a data unit receiving the phone position from the receiving unit, a remote control history or a customer VOC statistics history during a predetermine period in the corresponding region where the mobile device is positioned, and a process of verifying, by the analysis unit, whether the remote control history or customer VOC statistics history is more than a predetermined value.

The second step may include a process of receiving, by a receiving unit of the communication sensitivity analyzing unit, the communication sensitivity from the mobile device, and a process of analyzing, by the analyzing unit receiving the communication sensitivity from the receiving unit, whether the communication sensitivity is more than a predetermined value based on QoS.

The third step may include a process of feeding back, by the remote control result transmitting unit, the control result to the app through the TCP/IP when the communication sensitivity is more than the predetermined value based on the result QoS of analyzing the communication sensitivity of the vehicle, and a process of feeding back, by the remote control result transmitting unit, the control result to the app through the SMS when the communication sensitivity is equal to or less than the predetermined value based on the result QoS of analyzing the communication sensitivity of the vehicle.

The third step may include a process of feeding back, by the remote control result transmitting unit, the control result to the app through the TCP/IP when the communication sensitivity is more than a predetermined value based on the number of remote control history or customer VOC communication statistics history times, and a process of feeding back, by the remote control result transmitting server, the control result to the app through the SMS when the communication sensitivity is equal to or less than the predetermined value based on the number of remote control history or customer VOC communication statistics history.

In exemplary forms of the present disclosure, a communication sensitivity analyzing unit determines a transmission scheme according to a phone position or communication sensitivity to minimize inconvenience of a customer depending on a reception failure.

A remote control result transmitting unit reduces an increase in cost depending on SMS transmission by using a PUSH scheme using a TCP/IP.

An SMS message for verifying a result after executing remote control is transmitted by using TCP/IP based PUSH to use a continuous result verification service without separate movement.

BRIEF DESCRIPTION OF THE DRAWINGS

FIG. 7 illustrates a process of determining a scheme that transmits a remote control result through communication sensitivity according to an exemplary form.

DETAILED DESCRIPTION OF THE EMBODIMENTS

Figure 1:
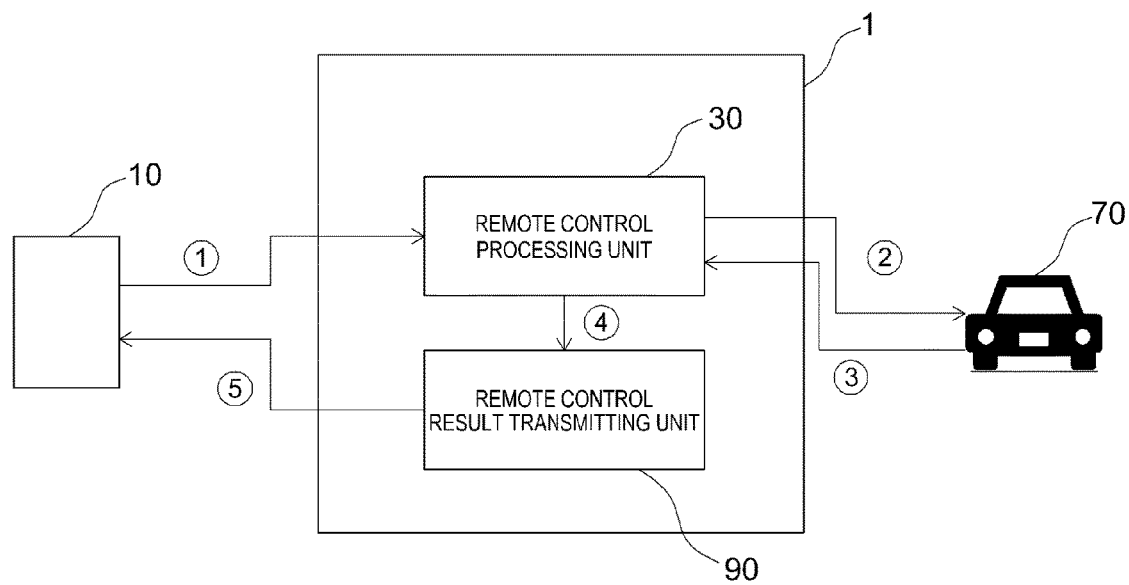
FIG. 1 illustrates a scheme that provides a remote control result in the related art.

Hereinafter, the present disclosure will be described in detail with reference to contents disclosed in the accompanying drawings. However, the present disclosure is not restricted or limited by exemplary forms. Like reference numerals presented in each drawing refer to like elements that perform substantially the same functions.

Objects and effects of the present disclosure may be naturally appreciated or more clear by the following description and the objects and effects of the present disclosure are not limited only by the following disclosure. Further, in the following description, a detailed explanation of known technologies associated with the present disclosure may be omitted to avoid unnecessarily obscuring the subject matter of the present disclosure.

FIG. 1 illustrates a scheme that provides a remote control result in the related art. Referring to FIG. 1, a vehicle remote control system in the related art may be downloaded and stored in a mobile device 10 such as the mobile device 10, a tablet, a PC, or provided as an embedded application program while manufacturing of the mobile device 10. The vehicle remote control system may be driven on an operating system platform of the mobile device 10.

The mobile device 10 may be a smart phone and include all means which are communicable by using other wireless means.

The vehicle remote control system installed in the mobile device 10 in the related art serves to generate and transmit a remote control command for remotely controlling a vehicle 70 to a vehicle mounting terminal spaced apart through a mobile communication network. When the mobile device 10 transmits a remote control command for controlling the vehicle 70 to a remote control processing unit 30, the remote control processing unit 30 may receive the remote control command and further transmit the remote control command to the vehicle 70, where the remote control processing unit 30 is included in a system 1 that further includes a remote control result transmitting unit 90. The mobile device 10 is notified with a result of the remote control from the vehicle 70 through a wireless network to transmit a history of the results of the remote control to the mobile device 10 again through the remote control result transmitting unit 90. However, a providing scheme in the related art guides the remote control result through the SMS and in SMS transmission, cost is generated per SMS and customer inconvenience occurs due to a reception failure and the problem will be hereinafter described according to the exemplary form of the present disclosure.

Figure 2:
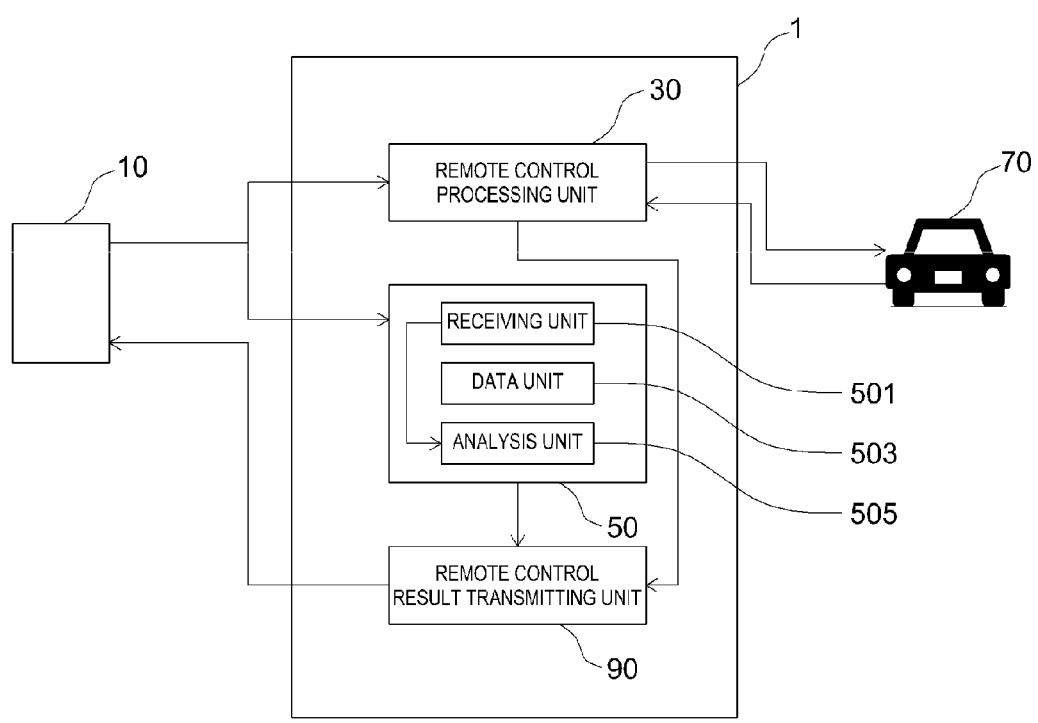
FIG. 2 illustrates a scheme that provides a remote control result by using a data history according to an exemplary form.

FIG. 2 illustrates a scheme that provides a remote control result by using a data history according to an exemplary form of the present disclosure. Referring to FIG. 2, a system 1 for guiding a remote control result using the mobile device 10 may include a remote control processing unit 30, a communication sensitivity analyzing unit 50, and a remote control result transmitting unit 90.

The remote control processing unit 30 may receive a control signal (e.g., including a control command from an app (①)) and transmit the control command according to the control signal to a control vehicle 70 (②). For example, a control signal received through the smart key may include a user input through an operation button displayed as part of the smart key display (e.g., a door locking or door opening operation button). The remote control processing unit 30 may receive the control signal and transmit the corresponding control command to the control vehicle 70 through the mobile communication network, and as a result, the door may be locked or unlocked according to the instructions of the control command. Accordingly, the control signal and control command may refer to the same set of instructions at different stages in the processes described herein.

The remote control processing unit 30 may receive the control command from the app running on the mobile device 10 and a user may download and install the vehicle remote control system provided in an app form by using the mobile device 10 thereof and interlock with the remote control processing unit 30 or the control vehicle 70 through app configuration set-up, and the like.

The remote control processing unit 30 may include identification information of a user terminal and a vehicle terminal so as to operate by interlocking with the app of the mobile device 10 and include a predetermined application program which may interlock with the identification information.

The remote control processing unit 30 may receive and store geofence set-up information from a vehicle owner and transmit the geofence set-up information to the app of the mobile device 10 and the vehicle terminal. When the remote control processing unit 30 registers and stores the geofence set-up information, the remote control processing unit 30 may notify the control command to the app in the case where the control command deviates from a set range.

When the remote control processing unit 30 receives the control command, the remote control processing unit 30 may transmit the control command to the matched vehicle terminal (②) and the vehicle terminal may transfer the control command to an electronic control unit (ECU) of the vehicle 70, or directly perform control of the vehicle 70 such as door locking, start ON/OFF, trunk opening, and the like according to the control command.

The communication sensitivity analyzing unit 50 collects a mobile device position or communication sensitivity from the mobile device 10 (①) to determine a feedback scheme for the remote control result of the vehicle as either one of TCP/IP or SMS (⑤). The related art does not include a separate communication sensitivity analyzing unit 50 to uniformly execute SMS transmission. Further, in order to improve the execution, it may be additionally determined whether a TCP/IP scheme is used by applying the communication sensitivity analyzing unit 50 (⑤) in the exemplary embodiment of the present disclosure.

The communication sensitivity analyzing unit 50 may include a receiving unit 501, a data unit 503, and an analysis unit 505.

The receiving unit 501 may receive the mobile device position or communication sensitivity. The receiving unit 501 may include a wireless communication module constituted by an RF unit and a modem MODEM and a GPS module which may track the position of the mobile device 10.

The RF unit may include an RF transmitter up-converting and amplifying a frequency of a transmitted signal and an RF receiver low-noise amplifying a received signal and down-converting the frequency. The modem MODEM may include a transmitter encoding and modulating a signal to be transmitted and a receiver demodulating and decoding the signal received by the RF unit. The GPS module tracks the position of the mobile device 10 to generate information on the mobile device position and transmit the generated information to the data unit 503.

The data unit 503 receives the mobile device position from the receiving unit 501 to search a remote control history or a customer VOC statistics history during a predetermined period in a corresponding region where the mobile device 10 is positioned and verify whether the remote control history or the customer VOC statistic history is more than a predetermined value.

The data unit 503 may search the remote control history or the customer VOC statistics history in the corresponding region by using the GPS module, and the like by receiving the collected mobile device position. The data unit 503 may collect data regarding the remote control history or the customer VOC statistics history during the predetermined period. In the exemplary embodiment of the present disclosure, the predetermined period may be set to 3 months. In the case of the customer VOC statistics history, a region where the number of customer VOC processing cases in which the remote control is executed, but the remote control is not normally processed due to a failure of the communication network is large is regarded as a region where the communication sensitivity is low to notify the remote control result by using the SMS like the related art.

The data unit 503 may represent the remote control result even by an entire comparison (%) form as well as the number of response times as yet another exemplary embodiment of the present disclosure and express the number of response times disclosed in claims by the entire comparison success rate (%).

The data unit 503 may establish a criterion by controlling even the predetermined period and the criterion is not limited to a matter mentioned as above. The data unit 503 may transmit the remote control result to the analysis unit 505 by querying the remote control history or the customer VOC statistics history through the predetermined period and the criterion.

Figure 3:
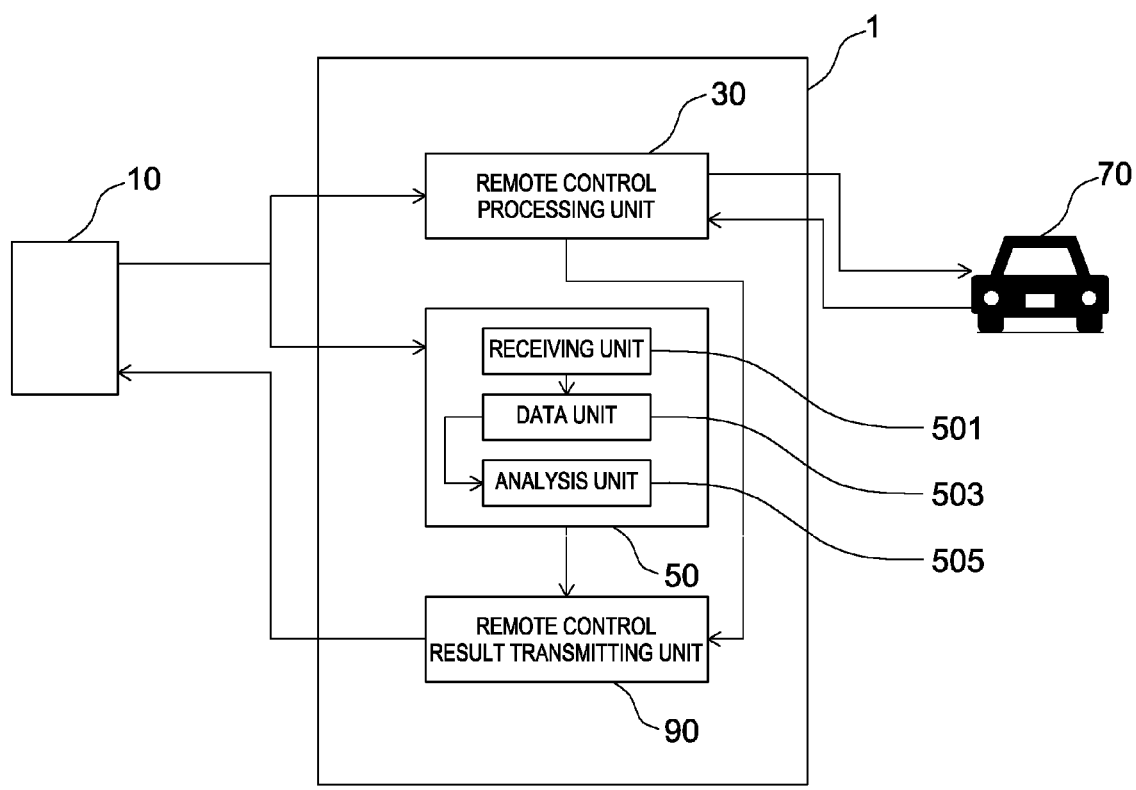
FIG. 3 illustrates a scheme that provides a remote control result by using communication sensitivity according to an exemplary form.

FIG. 3 illustrates a scheme that provides a remote control result by using communication sensitivity according to an exemplary form of the present disclosure. Referring to FIG. 3, a process of the remote control processing unit 30 is similar to the process described in FIG. 2 and the analysis unit 505 receives the communication sensitivity from the receiving unit 501 and analyzes whether the communication sensitivity is more than the predetermined value based on quality of service (QoS) to determine the communication scheme with the mobile device 10.

The analysis unit 505 may notify the remote control result by using the SMS like the related art when the quality of service (QoS) is equal to or less than 30% in the exemplary embodiment of the present disclosure. Further, the analysis unit 505 may notify the remote control result by using the SMS like the related art when the QoS is equal to or less than the criterion through a data history as described in FIG. 2.

Referring to FIGS. 2 and 3 described above, the remote control result transmitting unit 90 plays a common role and the remote control result transmitting unit 90 may receive the remote control result of the vehicle from the remote control processing unit 30 and transmit the remote control result to the app according to the feedback scheme determined by the communication sensitivity analyzing unit 50.

The remote control result transmitting unit 90 may feed back the remote control result to the app through the SMS when the communication sensitivity is equal to or less than the predetermined QoS criterion from the communication sensitivity analyzing unit 50 and feed back the remote control result through the TCIP/IP when the communication sensitivity is more than the predetermined QoS criterion.

The remote control result transmitting unit 90 may feed back the remote control result to the app through the SMS when remote control failure history statistic information representing the remote control history or the customer VOC statistics history form the communication sensitivity analyzing unit 50 is equal to or less than a predetermined value and feed back the remote control result through the TCIP/IP when the remote control failure history statistic information is more than the predetermined value.

In another exemplary form of the present disclosure, the remote control result transmitting unit 90 may transmit the remote control result to the app for user convenience for remotely controlling the vehicle and the display unit of the app may display a quick remote key screen and the operation button for controlling the vehicle and the user generates the vehicle remote control command by touching the operation button constituting the displayed quick remote key screen and wirelessly transmits the generated vehicle remote control command through the mobile communication network.

Figure 4:
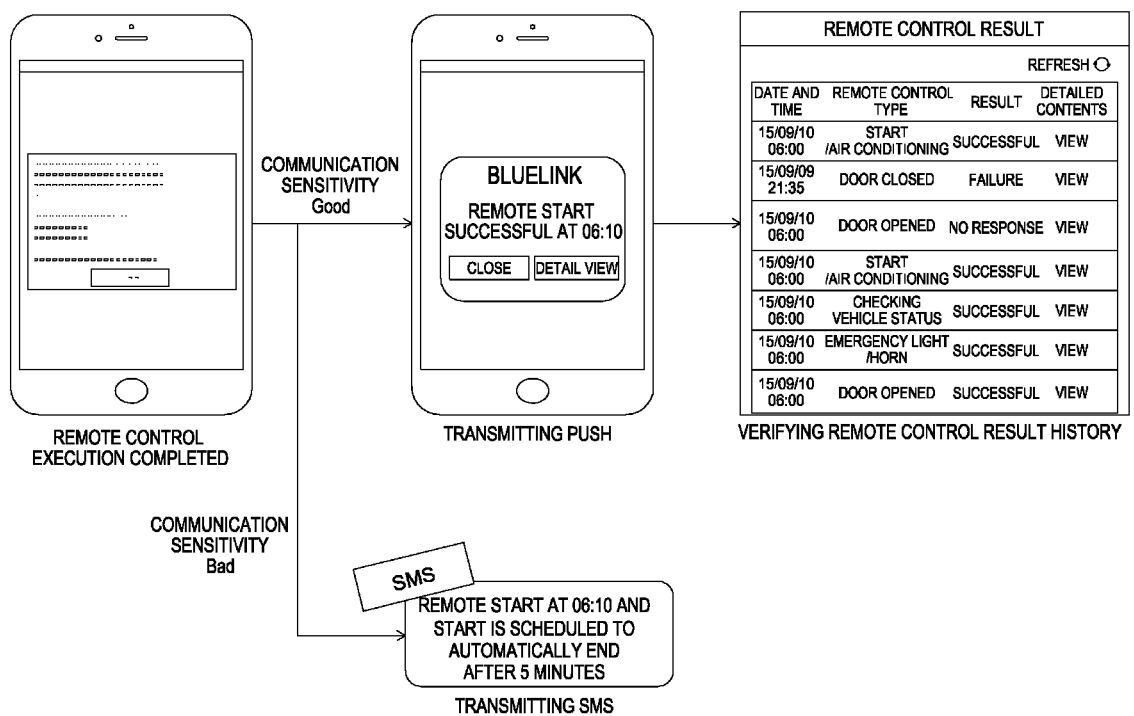
FIG. 4 illustrates a case in which a remote control result is displayed on a screen of a user according to an exemplary form.

FIG. 4 illustrates a case in which a remote control result is displayed on a screen of a user according to an exemplary form of the present disclosure. Referring to FIG. 4, contents of a user screen of the mobile device 10 may be known. In an app screen of the mobile device 10, an overall operation of the smart phone is controlled and for example, the vehicle remote control system according to the exemplary embodiment of the present disclosure as one application program may be mounted on the memory in advance by a smart phone manufacturer and be provided. The user may operate the quick remote key screen and the operation button by the application program mounted on the memory through the app.

Hereinafter, a method for guiding a result by using the remote control result guiding system 1 using the mobile device 10 will be described.

Figure 5:
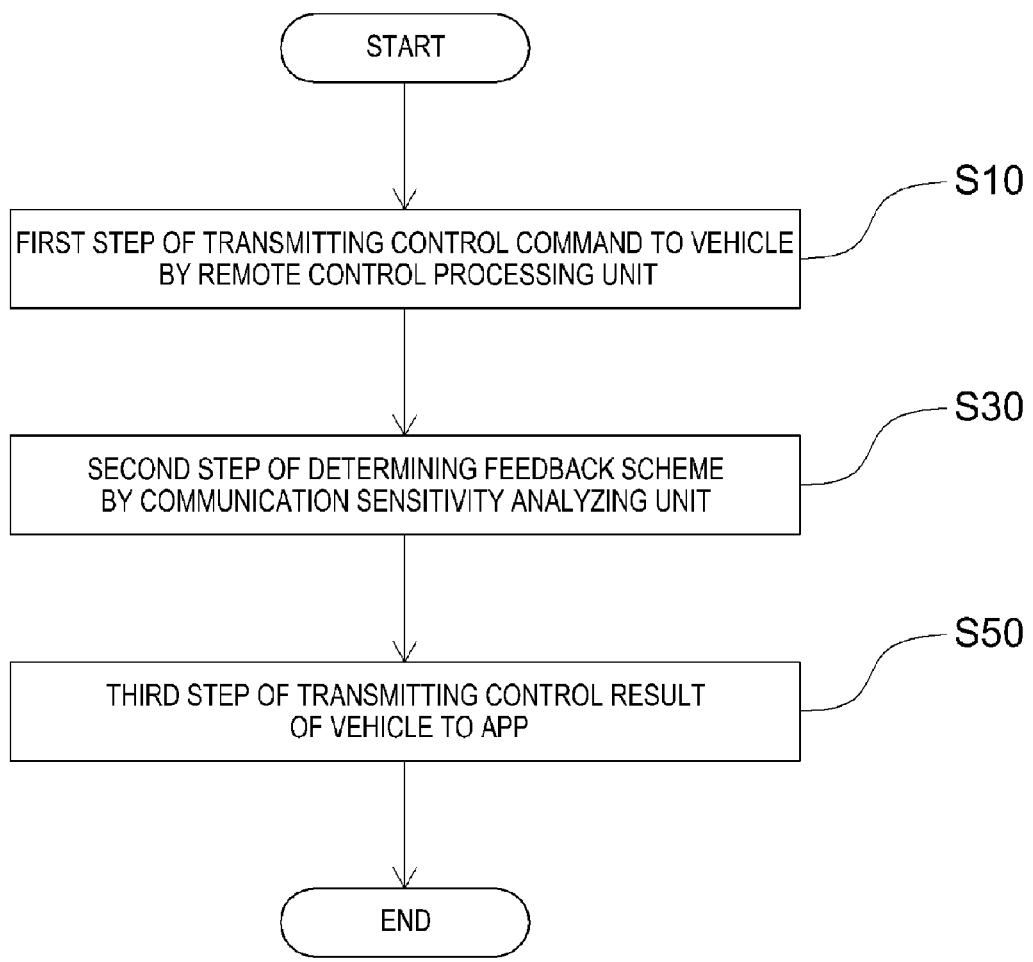
FIG. 5 is a flowchart of a method for remotely controlling a vehicle according to an exemplary form.

FIG. 5 is a flowchart of a method for remotely controlling a vehicle according to an exemplary embodiment of the present disclosure. The remote control result guiding method is largely constituted by 3 steps and each detailed process is divided and described for each step.

In a first step (S10), the remote control processing unit 30 of the mobile device 10 receives the control signal from the app and transmits the control command depending on the control signal to the vehicle. In the first step (S10), the control signal is received to transmit the control command to the corresponding control vehicle 70. The remote control processing unit 30 may receive a control signal from an app (①) and transmit the control command according to the control signal to a control vehicle 70 (②). The remote control processing unit 30 may receive a command from the app of the mobile device 10 and a user may download and install the vehicle remote control system provided in an app form by using the mobile device 10 thereof and interlock with the remote control processing unit 30 or the control vehicle 70 through environment set-up, and the like.

In a second step (S30), the communication sensitivity analyzing unit 50 that collects the mobile device position or the communication sensitivity from the mobile device 10 determines the feedback scheme for the remote control result of the vehicle as the TCP/IP or SMS.

Figure 6:
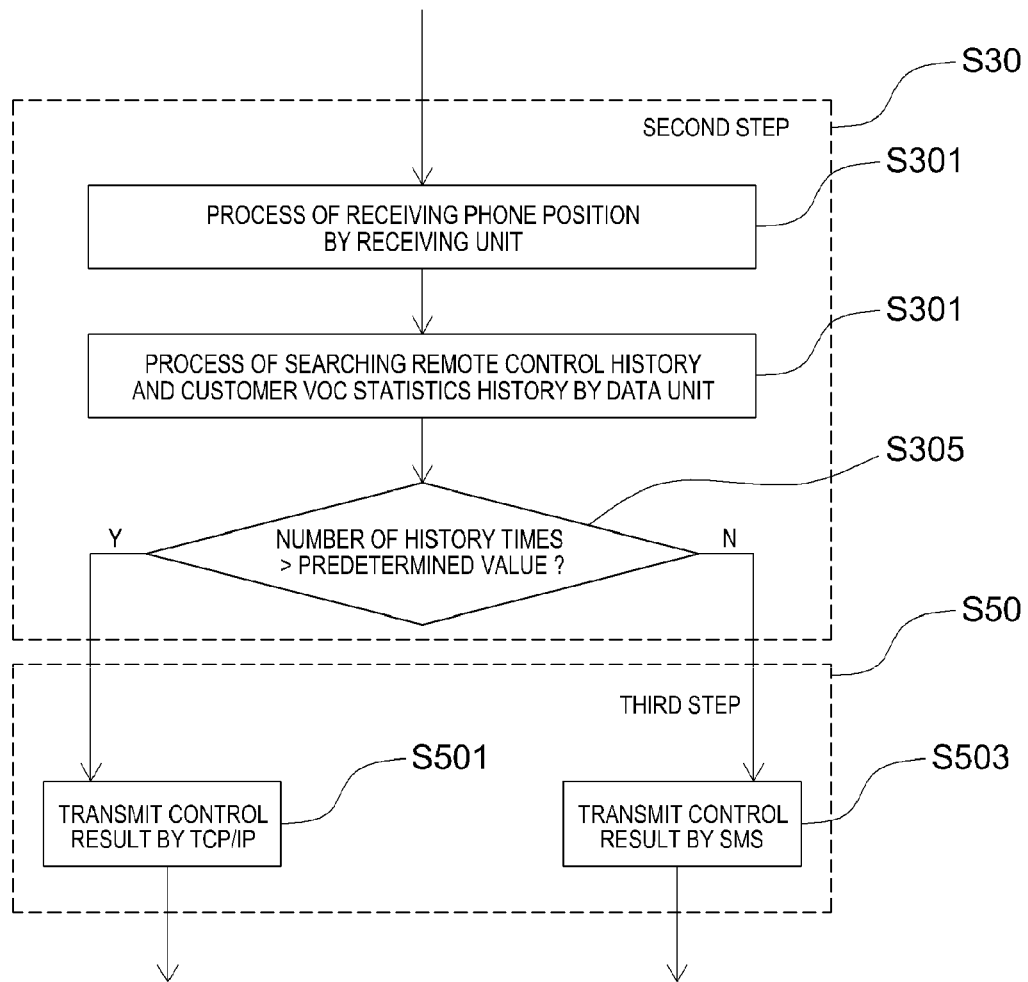
FIG. 6 illustrates a process of determining a scheme that transmits a remote control result through a mobile device position according to an exemplary form.

FIG. 6 illustrates a process of determining a scheme that transmits a remote control result through a mobile device position according to an exemplary embodiment of the present disclosure. Referring to FIG. 6, the second step may include a process of receiving, by a receiving unit 501 of the communication sensitivity analyzing unit 50, a mobile device position from the mobile device 10 (S301), a process of searching, by a data unit 503 receiving the mobile device position from the receiving unit 501, remote control failure history statistics information representing a remote control history or a customer VOC statistics history during a pre-determine period in the corresponding region where the mobile device 10 is positioned (S303), and a process of verifying, by the analysis unit 505, whether the remote control failure history statistics information is more than a predetermined value (S305).

The receiving unit 501 receives the mobile device position and transmits the mobile device position to the data unit 503 and the data unit 503 may determine whether the remote control failure history statistics information during a predetermined period is more than a predetermined value. When the remote control history or customer VOC statistics history is equal to or less than a predetermined value, a remote control result transmitting server may transmit the remote control result to the SMS like the related art and when the remote control history or customer VOC statistics history is more than the predetermined value, the remote control result may be transmitted through a TCP/IP network.

According to the exemplary form of the present disclosure, a criterion such as recent 3 months, or the like may be set and the remote control is executed by verifying a remote control accumulation history and customer VOC statistics, but a region (e.g., a region where VOC is received X times or more based on a day/week/month) where the number of customer VOC processing cases in which the remote control is not normally processed due to a failure of the communication network is large is regarded as a region where TCP/IP data communication sensitivity is low to command the result to be transmitted by the SMS.

FIG. 7 illustrates a process of determining a scheme that transmits a remote control result through communication sensitivity according to an exemplary form of the present disclosure. Referring to FIG. 7, according to yet another exemplary form, the second step may include a process of receiving, by a receiving unit 501 of the communication sensitivity analyzing unit 50, the communication sensitivity from the mobile device 10 (S307), and a process of analyzing, by the analysis unit 505 receiving the communication sensitivity from the receiving unit 501, whether the communication sensitivity is more than a predetermined value based on QoS (S309).

The receiving unit 501 receives the communication sensitivity and transmits the communication sensitivity to the analysis unit 505 and the analysis unit 505 may determine whether the QoS is more than a predetermined value. When the number of response times is equal to or less than a predetermined value, the remote control result transmitting server may transmit the remote control result by the SMS like the related art and when the number of response times is more than the predetermined value, the remote control result transmitting server may transmit the remote control result through the TCP/IP network.

The third step (S50) is a step of transmitting, by the remote control result transmitting unit 90 receiving the control result of the vehicle from the remote control processing unit 30, the remote control result to the app according to the feedback scheme determined by the communication sensitivity analyzing unit 50.

According to the exemplary form of the present disclosure, the third step may include a process of feeding back, by the remote control result transmitting unit 90, the remote control result to the app through the TCP/IP when the communication sensitivity is more than the predetermined value based on the remote control result QoS of analyzing the communication sensitivity of the vehicle (S501), and a process of feeding back, by the remote control result transmitting unit 90, the remote control result to the app through the SMS when the communication sensitivity is equal to or less than the predetermined value based on the remote control result QoS of analyzing the communication sensitivity of the vehicle (S503).

According to yet another exemplary embodiment of the present disclosure, the third step (S50) may include a process of feeding back, by the remote control result transmitting unit 90, the remote control result to the app through the TCP/IP when the number of remote control history of the vehicle or customer VOC communication history times is more than a predetermined value (S501), and a process of feeding back, by the remote control result transmitting server, the remote control result to the app through the SMS when the number of remote control history of the vehicle or customer VOC communication history is equal to or less than the predetermined value (S503).

The remote control result transmitting unit 90 may transmit the remote control result by the TCP/IP or SMS. According to the system of the present disclosure, the TCP/IP or SMS is selectively applied to show an effect of reducing cost of a remote control result transmitting service operated by only the SMS in the related art.

First, the TCP/IP as a primary communication protocol of the Internet may be used even in a primary network such as intranet or extranet and the TCP/IP is used even when the user configures a computer thereof in order to access the Internet.

The TCP/IP is a program constituted by two layers and the TCP as a higher layer serves to divide messages or files into smaller packets and transmit the packets through the Internet and reassemble the received packets to an original message. A lower layer, that is, the IP processes an address part of each packet to allow the packets to accurately reach a destination.

The remote control result transmitting unit 90 uses the network in the case of the mobile device 10 determined to be in a stable state based on the remote control result of the communication sensitivity analyzing unit 50 and each gateway on the network verifies the address of the message in order to find where the message is to be transferred. The respective packets may be transferred through different paths and the respective packets are reassembled in a final destination.

Next, when the scheme using the SMS is described, the remote control result transmitting unit 90 may transmit a text message prepared through the terminal to a message center (SMSC). The message center (SMSC) receiving the text message may store the message and thereafter, verify subscriber information and the position of a receiver-side mobile terminal and transmit the subscriber information and the position to a switch station (MSC).

The switch station (MSC) transmits the message to a base station (BTS) at which the receiver-side mobile terminal is positioned to transmit the text message from the terminal to the receiver-side mobile terminal through the wireless network.

Similar to a general short message service system, the SMS transmission scheme according to the exemplary form of the present disclosure may include an SMS processing server that may receive the text message through a packet data processing node (IWF and PSDN) and a packet data processing node (IWF and PSDN) receiving the text message from the terminal through a data link, and convert the protocol according to a standard of the message center (SMSC) and transmit the converted protocol to the message center (SMSC).

Last, the user may receive a report of the remote control result through the app. When the remote control result is transferred by the SMS scheme, the remote control result may include any one form of the text message, an MMS message, and a voice message.

The app screen of the user may include a user interface for inputting a user command and keys required for inputting figures and character information and even function keys or a touch pad required for setting various functions.

Although the present disclosure has been described in detail through the representative exemplary embodiment hereinabove, it will be appreciated that various modifications of the exemplary form of the present disclosure can be made by those skilled in the art within a limit without departing from the scope of the present disclosure. Therefore, the scope of the present disclosure should not be limited to the exemplary embodiment and should be defined by appended claims to be described below and all modifications or modified forms derived from equivalent concepts to the appended claims.

What is claimed is:

1. A system for remotely controlling a vehicle, the system comprising:
   a remote control processing unit configured to:
      receive a control signal including a control command generated from an app running on a mobile device; and
      transmit the control command to the vehicle based on the control signal;
   a communication sensitivity analyzing unit comprising:
      a receiving unit configured to:
         receive, from the mobile device, a mobile device position information and a communication sensitivity information;
      a data unit configured to:
         receive the mobile device position information from the receiving unit;
         search remote control failure history statistics information representing a remote control history or a customer VOC statistics history during a predetermined period in a region corresponding to the mobile device position information; and verify whether the remote control failure history statistics information is more than a predetermined history value; and an analysis unit configured to:
receive the communication sensitivity information from the receiving unit;

analyze whether a communication sensitivity included in the communication sensitivity information is more than a predetermined criterion based on quality of service (QoS) attributes; and determine a feedback scheme for reporting a remote control result of the vehicle as one of TCP/IP or SMS based on whether the communication sensitivity is greater than the predetermined criterion; and a remote control result transmitting unit configured to:
receive the remote control result of the vehicle from the remote control processing unit; and transmit the remote control result to the app running on the mobile device according to the feedback scheme.

2. The system of claim 1, wherein the remote control result transmitting unit is configured to transmit the remote control result to the app running on the mobile device through the SMS when the communication sensitivity described by the communication sensitivity information is equal to or less than the predetermined criterion; and wherein the remote control result transmitting unit is configured to transmit the remote control result through the TCP/IP when the communication sensitivity is greater than the predetermined criterion.

3. The system of claim 1, wherein the remote control result transmitting unit is configured to transmit the control result to the app running on the mobile device through the SMS when the remote control failure history statistic information is equal to or less than the predetermined history value; and wherein the remote control result transmitting unit is configured to transmit the remote control result through the TCP/IP when the remote control failure history statistic information is greater than the predetermined history value.

4. A method for remotely controlling a vehicle by a mobile device, the method comprising:
receiving, by a remote control processing unit of the mobile device, a control signal generated by an app running on the mobile device;

transmitting, by the remote control processing unit, a control command identified in the control signal to the vehicle based on the control signal;

receiving, by a receiving unit of a communication sensitivity analyzing unit, mobile device position information and communication sensitivity information from the mobile device;

receiving, by a data unit of the communication sensitivity analyzing unit, the mobile device position information from the receiving unit;

searching, by the data unit, remote control failure history statistics information representing a remote control history or a customer VOC statistics history during a predetermine period in a region corresponding to the mobile device position information;

verifying, by the data unit, whether the remote control failure history statistics information is more than a predetermined history value;

receiving, by a remote control result transmitting unit, a remote control result of the vehicle from the remote control processing unit;

determining, by an analysis unit of the communication sensitivity analyzing unit, a feedback scheme for the remote control result of the vehicle as one of TCP/IP or SMS; and transmitting, by the remote control result transmitting unit, the remote control result to the app according to the feedback scheme.

5. The method of claim 4, wherein determining the feedback scheme comprises:
analyzing, by the analyzing unit, whether a communication sensitivity included in the communication sensitivity information is more than a predetermined criterion based on quality of service (QoS) attributes.

6. The method of claim 5, wherein transmitting the remote control result to the app comprises:
transmitting the remote control result to the app through the TCP/IP when the communication sensitivity is more than the predetermined criterion; and transmitting the remote control result to the app through the SMS when the communication sensitivity is equal to or less than the predetermined criterion.

7. The method of claim 5, wherein transmitting the remote control result to the app comprises:
transmitting the remote control result to the app through the TCP/IP when the remote control failure history statistic information or the customer VOC statistics history is greater than the predetermined history value; and transmitting the remote control result to the app through the SMS when the remote control failure history statistic information or the customer VOC statistics history is equal to or less than the predetermined history value.

* * * * *